United States Patent [19]

Sarma et al.

[11] Patent Number: 5,492,760
[45] Date of Patent: Feb. 20, 1996

[54] WATER TREE RESISTANT, MOISTURE CURABLE INSULATION COMPOSITION FOR POWER CABLES

[75] Inventors: Haridoss Sarma; Alexander Shaikevitch, both of Brampton, Canada

[73] Assignee: AT Plastics Inc., Brampton, Canada

[21] Appl. No.: 352,705

[22] Filed: Dec. 5, 1994

[51] Int. Cl.$^6$ .............................. B32B 25/20; C08L 9/00; C08L 43/04

[52] U.S. Cl. .......................... 428/378; 428/391; 428/447; 525/72; 525/87

[58] Field of Search .................................. 428/378, 391, 428/447; 525/72, 87

[56] References Cited

U.S. PATENT DOCUMENTS

| | | | |
|---|---|---|---|
| 4,234,624 | 11/1980 | Linderoth et al. | 427/55 |
| 4,259,905 | 4/1981 | Abiko et al. | 101/467 |
| 4,689,369 | 8/1987 | Ishino et al. | 525/288 |
| 4,753,992 | 6/1988 | Umpleby | 535/100 |
| 4,789,708 | 12/1988 | Guzy | 525/263 |
| 4,795,786 | 1/1989 | Umpleby | 525/326.5 |
| 4,798,864 | 1/1989 | Topcik | 525/71 |

FOREIGN PATENT DOCUMENTS

| | | |
|---|---|---|
| 150773 | 8/1985 | European Pat. Off. . |
| 99640 | 9/1986 | European Pat. Off. . |
| 410431 | 1/1991 | European Pat. Off. . |
| 322309 | 1/1991 | Japan . |

OTHER PUBLICATIONS

Patent Abstract of Japan: 82–208006, Dec. 21, 1982.
Patent Abstract of Japan: 86–235064, Oct. 2, 1986.
Patent Abstract of Japan: 85–157105, Aug. 17, 1985.

*Primary Examiner*—Thomas Hamilton, III
*Attorney, Agent, or Firm*—Cushman Darby & Cushman

[57] ABSTRACT

A cross-linkable polymer composition containing a cross-linkable polymer having at least one hydrolysable silane group, a silanol condensation catalyst and a polybutadiene. The composition provides a cross-linked polymer having good water tree resistance properties, for use as insulation in electrical cables.

20 Claims, No Drawings

5,492,760

WATER TREE RESISTANT, MOISTURE CURABLE INSULATION COMPOSITION FOR POWER CABLES

FIELD OF THE INVENTION

This invention relates to moisture cross-linkable compositions for use as cable insulation for high voltage power cables and more particularly to compositions comprising a blend of ethylene vinyl silane copolymer and polybutadiene to inhibit the propagation of water trees in the electrical insulation.

BACKGROUND TO THE INVENTION

High voltage distribution cable insulations comprised of cross-linked ethylene polymer (XLPE) compositions were initially expected to last 20–25 years. However, the actual failure rate of these cables has been found to be significantly greater than the anticipated failure rate. Despite the fact that ethylene polymer is considered to be the most moisture resistant polymer available, water has been identified as a contributing factor to this unexpected failure in performance. Tree like patterns, named "water trees" occur on aging when the polymer insulation is exposed to water and electrical stress. Water trees, once initiated, develop slowly and lead to a reduction in the dielectric strength of the insulation and result in cable failures. Accordingly, it is widely accepted that water trees are responsible for the trend of increasing power distribution cable failure rates.

Dicumyl peroxide is by far the most commonly used chemical agent to cross-link polyethylene. The power cable with cross-linkable conductor shield, insulation and insulation shield, is extruded either in a tandem or true triple extrusion process and subsequently cross-linked in a continuous vulcanisation line at high pressures of steam or dry nitrogen at elevated temperatures. This process requires a large capital investment. A more economic alternative is the silane moisture cure process wherein an organo silane grafted PE or a copolymer of an organo silane and ethylene is first extruded with a tin catalyst master batch. Cross-linking is then affected in the presence of moisture at moderate temperatures and pressures. Since the ingress of moisture necessary for cross-linking is essentially diffusion limited, the resultant water content and size of the microvoids are comparable to those observed in dry cured XLPE cable. Although technical reports on field-aged cables insulated with moisture cross-linked insulation indicate the superiority of this insulation over peroxide cross-linked polyethylene, these are not certainly devoid of water trees. It would therefore be desirable to have a moisture cross-linkable insulation with water tree resistant properties in addition to its special mechanical and electrical attributes.

Several methods to improve the performance of peroxide cross-linked polyethylene insulation against dielectric deterioration by water tree generation and growth have been described in the literature. Several patents relate to the use of an organo-silane, siloxane and silicone additives to inhibit water tree growth in XLPE. European patent (EP 0,099,640) describes a blend of ethylene and vinyl acetate copolymer as a water tree retardant material. This latter reference had been extended to cover ethylene silane copolymers (JP 3-22309). EP 0,410,431 discloses that an ethylene alpha-olefin copolymer with a density not greater than 920 kg/m$^3$, grafted with a hydrolysable vinyl silane compound could behave as a water tree resistant insulation. Water curable azidosulfonyl modified ethylene polymers are claimed to be water tree resistant in EP 0,150,773. A copolymer of ethylene and methacryloyloxypropyl trimethoxysilane has so far been the only reactor copolymer claimed to be water tree retardant when used as an electrical insulation (JP 82,208,006). Blends of ethylene olefin copolymers and graft polyolefin-siloxanes form the subject of patents JP 86,235,064 and 85,157,105.

However, there remains a need for a moisture cross-linkable insulation composition which when cross-linked has improved resistance to water tree growth.

SUMMARY OF THE INVENTION

Surprisingly, we have discovered cross-linkable compositions which when cross-linked by moisture treatment provide improved resistance to water tree growth.

It is an object of the present invention to provide a cross-linkable silane polymer composition of use in producing a cross-linked polymer having improved water tree resistance properties.

It is a further object of the invention to provide a cross-linked silane polymer composition having improved water tree resistance properties.

It is a yet further object of the invention to provide a process of manufacturing a cross-linked silane polymer composition having improved properties.

Accordingly, the invention provides in its broadest aspect a cross-linkable polymer composition containing a cross-linkable polymer having at least one hydrolysable silane group and at least one silanol condensation catalyst characterized in that said composition further comprises a polybutadiene.

The term "polymer" in this specification and claims includes copolymers. Preferably, the polybutadiene is a low molecular weight, low crystalline syndiotactic 1,2 polybutadiene or a hydroxyl terminated low molecular weight viscous polybutadiene.

The cross-linkable polymer is preferably a silane grafted homopolymer, or copolymer, or terpolymer including ethylene propylene rubbers or a copolymer of an olefin and a silane or a terpolymer of an olefin,silane and acetates or acrylates. More preferably, the cross-linkable polymers of use in the invention are previously known and described and prepared, for example, in U.S. Pat. No. 4,689,369 which is incorporated herein by reference. Thus, the invention provides a composition comprising a copolymer prepared by radically polymerizing a polymerizable monomeric mixture consisting essentially of ethylene and at least one ethylenically unsaturated silane compound selected from the group consisting of vinyltrimethoxysilane, vinyltriethoxysilane and methacryloxypropyltrimethoxysilane under a pressure ranging from 1000 to 4000 kg/cm$^2$, and containing said silane compound in an amount of from 0.5 to 2% w/w. Particularly, the ethylenically unsaturated silane compound is vinyltrimethoxysilane.

Favoured compositions of the invention are those wherein said cross-linkable polymer is an ethylene vinyl silane copolymer in an amount selected from 85–99% w/w, said polybutadiene is from 1–15% w/w and said silanol condensation catalyst is from 0.001–10% w/w.

The aforesaid compositions according to the invention have found particular use in the coating of metal electrical conductor wire and cable, with implications that it can be extended to any electrical apparatus selected from the group consisting of undersea cables, transformer insulations, switch gears, submersible motors, capacitor coatings and cable joints. Conventional plastics extrusion, injection moulding or rotomolding of the cross-linkable polymer of the present invention can be carried out to achieve the desired end product.

The invention provides in a further aspect a process for producing a cross-linked polymer said process comprising treating a composition as hereinabove defined under cross-linking conditions in a cross-linking zone to produce said cross-linked polymer, which process is enhanced by the application of an effective amount of heat and/or moisture.

The processes of the invention may be carried out using well-known prior art methods for the coating of wire and rotomolding of containers or injection molding of components. The processing zone can be a conventional extruder, e.g. a single screw type. A typical extruder has a hopper at its upstream end and a die at its downstream end. The hopper feeds into a barrel, which contains a screw. At the downstream end between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1.

The residence time of the mixture in the processing zone is, for example, of sufficient length to complete all or part of the extrusion, injection molding, or roto molding. This time is in the range of about 20 to about 2000 seconds and is preferably about 60 to about 1000 seconds.

The cross-linking zone is usually a hot water bath at a temperature selected from 50° C. to 100° C. through which the extruded cable or the molded part is passed. The residence time in this zone can be in the range of about 0.01 to about 72 hours and is preferably about 1 to about 24 hours. As an alternative to the water bath, the zone can be humidified at a relative humidity of at least about 50 percent at temperatures selected from about 20° C. to about 150° C. and preferably in the range of about 50° C. to about 100° C. The continuous vulcanisation tube conventionally used in the cable industry and operated at suitable steam temperature and pressure can be yet another alternative to the water bath.

Conventional additives can be added to the mixture introduced into the processing zone. The amount of additive is usually in the range of about 0.01% w/w to about 50% w/w based on the weight of the resin. Useful additives are antioxidants, ultraviolet absorbers, antistatic agents, pigments, dyes, fillers, slip agents, fire retardants, plasticizers, processing aids, lubricants, stabilizers, and smoke inhibitors. Blends of the hydrolyzable polymer and other polymers can be prepared in the processing zone provided that the resins to be blended with the hydrolyzable copolymer will not cross-link. Examples of these resins are low density polyethylene, high density polyethylene, polypropylene, linear low density polyethylene, and very low density polyethylene (equal to or less than 0.915 grams per cubic centimeter).

In a yet further aspect, the invention provides a substrate such as an electrical conductor wire or container having a surface coated with a cross-linked polymer according to the invention.

The silanol condensation catalyst is present in the cross-linkable composition of the invention as defined above in any required amount, for example, ranging from 0.001–10% w/w. Examples of such silanol condensation catalysts are carboxylic acid salts of metal such as tin, zinc, iron, lead and cobalt, organic bases, inorganic acids, and organic acids. Representative examples of these silanol condensation catalysts are (1) carboxylic acids of metals such as dibutyltin dilaurate, dibutyltin diacetate, dibutyltin dioctoate, stannous acetate, stannous caprylate, lead naphthenate, lead caprylate and cobalt naphthenate; (2) organic bases such as ethylamine, dibutylamine, hexylamine and pyridine; (3) inorganic acids such as sulfuric acid and hydrochloric acid; and (4) organic acids such as toluenesulfonic acid, acetic acid, stearic acid and maleic acid.

Thus, the silanol condensation catalyst is used in an amount of 0.001 to 10 parts, preferably 0.01 to 5 parts, and more preferably 0.01 to 3 parts, by weight per 100 parts by weight of the silane-crosslinkable ethylene copolymer. If the amount of the silanol condensation catalyst is less than 0.001 part by weight per 100 parts by weight of ethylene copolymer, the cross-linking reaction does not proceed sufficiently. If, on the other hand, the amount of the silanol condensation catalyst is more than 10 parts by weight per 100 parts by weight of copolymer, it may compromise physical properties.

The catalyst is preferably added to the cross-linkable polymer in the form of a master batch, i.e. mixed with a polymer, such as polyethylene. The master batch, thus, contains a minor amount of catalyst, generally about 1–25% by weight, preferably about 10–20% by weight. Alternatively, the catalysts may be added directly to the cross-linkable polymer, there being no need to first produce a master batch.

Fillers such as silicates, e.g. kaolin, talc, montmorillonite, zeolite, mica, silica, calcium silicate, asbestos, powdered glass, glass fibre, calcium carbonate, gypsum, magnesium carbonate, magnesium hydroxide, carbon black and titanium oxide may be present in the composition of the invention without detracting from the efficacy thereof. The content of the inorganic filler may be up to 60% by weight, as based on the sum of the weights of the filler and the silane-containing polymer.

The cross-linkable ingredients of the invention as hereinabove defined may be prepared into the desired composition in a mixer conducted by conventional methods. The processed product is then silane-cross-linked, for example, with water for use, for example, as electric cable insulation or rotomold lining or injection molded component.

DESCRIPTION OF PREFERRED EMBODIMENTS OF THE INVENTION

In order that the invention may be better understood, preferred embodiments will now be described by way of example only.

Accelerated Water Tree-Growth Test

The effectiveness of insulation compositions was judged by performing accelerated water tree growth (AWTG) tests on molded samples of the insulation. The test utilized compression molded dish-shaped specimens with built-in protrusion defects of 20 micrometer tip radius. The design of the test sample was the same as described in U.S. Pat. No. 4,144,202 and Canadian patent No. 1,106,165. The polymer blend and the catalyst/antioxidant master batch were blended in a Brabender extruder with a capillary die. The strands of the insulation composition were collected in a mold to be pressed into a dish. The molded samples were cross-linked in water at 90° C. The dish was then annealed at 75° C. for 72 hours and filled with 0.1M. NaCl electrolyte solution. A platinum electrode dipped in this electrolyte was connected to a 1 kHz high voltage source. The average electric field with an applied voltage of 6 kV was 2 kV/mm; and the calculated electrical stress enhancement at the protrusion tip was approximately 200. Under these conditions the test sample quickly developed water trees at the tip of the protrusion.

After a preset test period, the samples were removed from the test chamber and each protrusion was punched out using a rectangular or circular die and an arbor press. The resulting discs were sectioned into slices 200 micrometers thick and placed in a boiling solution consisting of 6 g methylene blue and 0.5 g sodium carbonate in 200 ml of distilled water for 5 minutes. The slices were than mounted on microscopic glass slides for examination and measurements of size of water trees. The average tree sizes were than calculated.

The performance of the compositions of the present invention was compared to a commercially available water tree retardant compound (peroxide cross-linked) described in U.S. Pat. No. 4,144,202 and Canadian patent No. 1,106, 165.

The formulations were prepared on a Brabender Sigma Blade Mixer with 500 g capacity bowl by blending at 150° C.@20 rpm for 10 minutes. The EVS Copolymer had approximately 2 wt % vinyltrimethoxysilane content. The EVS Copolymer is a commercially produced under high pressure, free radical copolymer of ethylene and vinyl trimethoxysilane in pellet form, maintained dry in water impermeable packaging and sold under the trademark AQUA-LINK® (AT PLASTICS INC., BRAMPTON, ONTARIO) Canada.

The moisture cross-linkable insulation compositions tested for water tree growth consisted of the three following types of components:

(a) AQUA-LINK ethylene vinyl silane copolymer having a melt flow index of 0.65 g/10 min and a density 926 kg/m$^3$ was used in all of the investigations;

(b) a blend component additive selected from polybutadiene, EPDM rubber and an ethylene alpha-olefin (also referred to as metallocene polyethylene) copolymer of density 885 kg/m$^3$, was present. The commercial sources with trademarks, relevant material characteristics and concentrations employed of these compounds are provided in Table 1; and (c) an organic tin catalyst and stabilizer master batch, let down in the polymer blend at 5% w/w. Three different master batches, MB1, MB2 and MB3 were used. The most preferred contained hindered amine light stabilizer. The master batch compositions are provided in Table 2.

TABLE 1

The blend component additive in the silane copolymer insulation composition

| Component | Trademarks | Supplier | Concn. used % w/w | Physical Appearance | Density (kg/m$^3$) |
|---|---|---|---|---|---|
| Polybutadiene | RB810 RB820 RB830 | Japan Synthetic Rubber Co. | 1.5 to 10 | free flowing pellets | 901 906 909 |
| hydroxyl terminated polybutadiene | Poly bd ® R-45M | elf Atochem | 5 | viscous fluids | 901 |
| EPDM | EM7200 | Uniroyal Chemicals | 5 | free flowing pellets | Not available |
| EPDM/HDPE blend | IM7565 | | | | |
| Ethylene alpha-olefin (or metallocene polyethylene) | Exact 4036 | Exxon Chemicals | 5 | free flowing pellets | 885 |

Surprisingly, we have found that although the blend components are all rubbers, only polybutadiene was found to be effective for improving water tree resistance.

TABLE 2

Compositions of the catalyst/stabilizer master batches (MB) used with the moisture curable insulation

| Component | Trademark | Supplier | MB1 (% w/w) | MB2 (% w/w) | MB3 (% w/w) |
|---|---|---|---|---|---|
| polyethylene | AT 209 | AT Plastics | 95.0 | 93.8 | 94.0 |
| dibutyl tin dilaurate | Fascat 4202 | Atochom | 1.0 | — | 1.0 |
| dioctyl tin dimaleate | Thermolite 813 | Atochem | — | 2.2 | |
| phenolic ester | Irganox 1010 | Ciba | 2.0 | 2.0 | 2.0 |
| hindered amine | Chimasorb 944 | Ciba | — | — | 2.0 |
| thio phenol | Santonox R | Monsanto | 1.0 | 1.0 | — |
| diacyl hydrazine | MD 1024 | Ciba | 1.0 | 1.0 | 1.0 |

The master batches described in Table 2 were used with the blends at 5% w/w let down levels.

Accelerated water tree tests as aforesaid described were performed in three different series. The first series consisted of examining the effect of the catalyst/stabilizer master batch and that of the concentration of polybutadiene RB-820 of density 906 kg/m$^3$ on the water tree growth in moisture cross-linked silane copolymer insulation.

TABLE 3

Average size of water trees for cross-linkable polymer and master batch mixtures
(test time = 750 hours)

| Sample No. | Insulation Composition | Average size of trees (m) |
|---|---|---|
| 1 | AT 910/MB1 | 500 |
| 2 | AT 910/MB2 | 460 |
| 3 | AT 910/MB3 | 310 |
| 4 | AT 910/MB2/1.5% w/w RB820 | 340 |

TABLE 3-continued

Average size of water trees for cross-linkable polymer
and master batch mixtures
(test time = 750 hours)

| Sample No. | Insulation Composition | Average size of trees (m) |
|---|---|---|
| 5 | AT 910/MB2/3.0% w/w RB820 | 250 |
| 6 | AT 910/MB2/5.0% w/w RB820 | 190 |
| 7 | AT 910/MB2/10.0% w/w RB820 | 180 |
| 8 | AT 910/MB3/5.0% w/w RB820 | 165 |

The tests were performed at room temperature up to a period of 750 hours. The average sizes of the water trees grown in the various samples are given in Table 3, which shows that the use of hindered amine in the catalyst/stabilizer master batch MB3 had resulted in a marginal decrease of the size of water trees in silane copolymer. The differences in the type and concentration of the tin catalyst between MB1 and MB2 (refer Table 2) did not have any influence on the desired properties. Addition of polybutadiene to the silane copolymer at an optimum 5% w/w resulted in a very noticeable decrease in the size of water trees; any further increase in its concentration did not have a profound influence in the performance of the insulation. The use of polybutadiene along with the MB3 (containing hindered amine) further reduced the size of water trees.

Following this series of tests, commercially available polybutadienes (low molecular weight, low crystalline RB810, 820 and 830 and an hydroxyl terminated viscous liquid) were blended with ethylene vinyl silane copolymer at the optimum 5% w/w concentration and cross-linked using the catalyst/stabilizer master batch MB3. These cross-linked compositions were then tested for water tree growth at room temperature up to a period of 950 hours. Sample 1 in Table 3 was used as a reference sample and the commercially available peroxide cross-linkable compound UCC 4202 (Trademark of Union Carbide) was used for comparison. The latter is the most widely used by the industry as power cable insulation. The results are given in Table 4.

TABLE 4

The size of the longest water trees
in Examples 1, 9–12 and UCC 4202
(test time = 950 hours)

| Examples | Insulation Composition | size of water tree (m) in three samples |
|---|---|---|
| 1 | AT 910/MB1 | 960, 800, 1000 |
| 9 | AT 910/MB3/5.0% w/w RB810 | 30, 300, 260 |
| 10 | AT910/MB3/5.0% w/w RB820 | 320, 320, 300 |
| 11 | AT 910/MB3/5.0% w/w RB830 | 300, 360, 340 |
| 12 | AT 910/MB3/5.0% w/w R-45HT | 300, 320, 320 |
| UCC 4202 peroxide cured | — | 280 |

The experimental results confirm the effect of polybutadiene in reducing the water tree growth in moisture cross-linked silane copolymer insulation and in rendering the performance of the insulation close to that of the conventional peroxide cross-linked water tree retardant insulation composition.

The addition of other potential rubber components to the silane copolymer did not match this surprising effect of polybutadiene. EPDM rubbers and polyethylene of very low density produced either by metallocene catalyst technology or conventional catalyst technologies are widely used in the electrical industry. Examples from this family of flexible rubbers were therefore chosen to study their effect on silane copolymer. Table 5 gives the results on this series of tests wherein Example 3 was used as reference.

TABLE 5

Average size of water trees in Example 3 and 13–16
(test time = 750 hours)

| Examples | Insulation Composition | Average size of water trees (m) |
|---|---|---|
| 3 | AT 910/MB3 | 256 |
| 13 | AT 910/MB2/5.0% w/w IM7200 | 250 |
| 14 | AT 910/MB2/5.0% w/w IM7565 | 250 |
| 15 | AT 910/MB3/5.0% w/w Exact 4036 | 310 |
| 16 | AT 910/MB3/5.0% w/w Exact 4036 | 350 |

The samples compounded with EPDM (IM7565 and IM7200) exhibited crazing defects implying its incompatibility with the silane copolymer and therefore of no practical relevance and use. Exact 4036, a metallocene catalyst technology very low density polyethylene (density 885 kg/m$^3$) did not offer significant improvement over the blends with polybutadiene, although its density was lower. The present invention therefore brings out the importance of polybutadiene rubber as a suitable blend component to ethylene silane copolymer. Not limited by the examples given here, the present invention is readily applicable to trimethoxy silane grafted polymer and to other silane copolymers. Because of the presence of unsaturation, the best way to incorporate polybutadienes in grafted polymers would be through melt compounding after the grafting step.

While the invention has been described in detail and with reference to specific embodiments thereof, it will be apparent to one skilled in the art that various changes and modifications can be made therein without departing from the spirit and scope thereof.

We claim:

1. An improved cross-linkable polymer composition containing a cross-linkable polymer having at least one hydrolysable silane group and at least one silanol condensation catalyst characterized in that said composition further comprises a polybutadiene.

2. A composition as defined in claim 1 wherein said crosslinkable polymer is a silane grafted homopolymer or copolymer, or a copolymer of an olefin and a silane.

3. A composition as defined in claim 2 wherein said composition comprises a copolymer prepared by radically polymerizing a polymerizable monomeric mixture consisting essentially of ethylene and at least one ethylenically unsaturated silane compound selected from the group consisting of vinyltrimethoxysilane, vinyltriethoxysilane and methacryloxypropyltrimethoxysilane under a pressure ranging from 1000 to 4000 kg/cm$^2$, and containing said silane compound in an amount of from 0.5 to 2% w/w.

4. A composition as defined in claim 3 wherein said ethylenically unsaturated silane compound is vinyltrimethoxysilane.

5. A composition as defined in claim 1 wherein said crosslinkable polymer is an ethylene vinyl silane copolymer in an amount selected from 85–99% w/w, said polybutadiene is from 1–15% w/w and said silanol condensation catalyst is from 0.001–10% w/w.

6. A composition as defined of claim 1 wherein said polybutadiene is a low molecular weight, low crystalline syndiotactic 1,2-polybutadiene or a hydroxyl terminated low molecular weight viscous polybutadiene.

7. A process for producing a cross-linked polymer comprising the steps of:

treating a composition comprising a cross-linkable polymer having at least one hydrolyzable silane group, at least one silanol condensation catalyst and a polybutadiene, under cross-linking conditions to produce said cross-linked polymer.

8. A process as defined in claim 7 wherein said cross-linking conditions comprise subjecting said composition to an effective amount of heat and/or moisture to effect said cross-linking.

9. A process as defined in claim 7, further comprising the step of rotomolding, injection molding or extruding the composition prior to said cross-linking step.

10. A cross-linked polymer as made by a process of claim 7.

11. A coated substrate comprising a substrate coated with a cross-linked polymer as defined in claim 10.

12. A coated substrate as defined in claim 11 wherein said substrate is an electrical conducting metal wire or cable.

13. A coated substrate as defined in claim 11 wherein said substrate is the surface of a metal vessel.

14. An electrical conductor coated with, or having extruded thereon, a cross-linked polymer as defined in claim 10.

15. A cable or wire comprising a metal core and at least one layer surrounding the core comprising a composition as defined in claim 10.

16. A coated substrate having enhanced resistance to water tree formation comprising a substrate which is coated with a composition comprising a cross-linkable polymer having at least one hydrolyzable silane group, at least one silanol condensation catalyst, and a polybutadiene.

17. The coated substrate according to claim 16, wherein said substrate is an electrical conducting metal wire or cable and said coating has been cured using moisture.

18. The coated substrate according to claim 16, wherein said substrate is a metal vessel and said coating has been cured using moisture.

19. The coated substrate according to claim 16, wherein said cross-linkable polymer is a silane grafted homopolymer or copolymer, or a copolymer of an olefin and a silane.

20. The coated substrate according to claim 16, wherein said polybutadiene is a low molecular weight, low crystalline syndiotactic 1,2-polybutadiene or a hydroxyl terminated low molecular weight viscous polybutadiene.

* * * * *